Nov. 4, 1924.
C. L. HOWSE
1,513,993
ELECTRICAL CONTROL APPARATUS FOR SECURING SHAFT SYNCHRONISM
Filed March 31, 1921
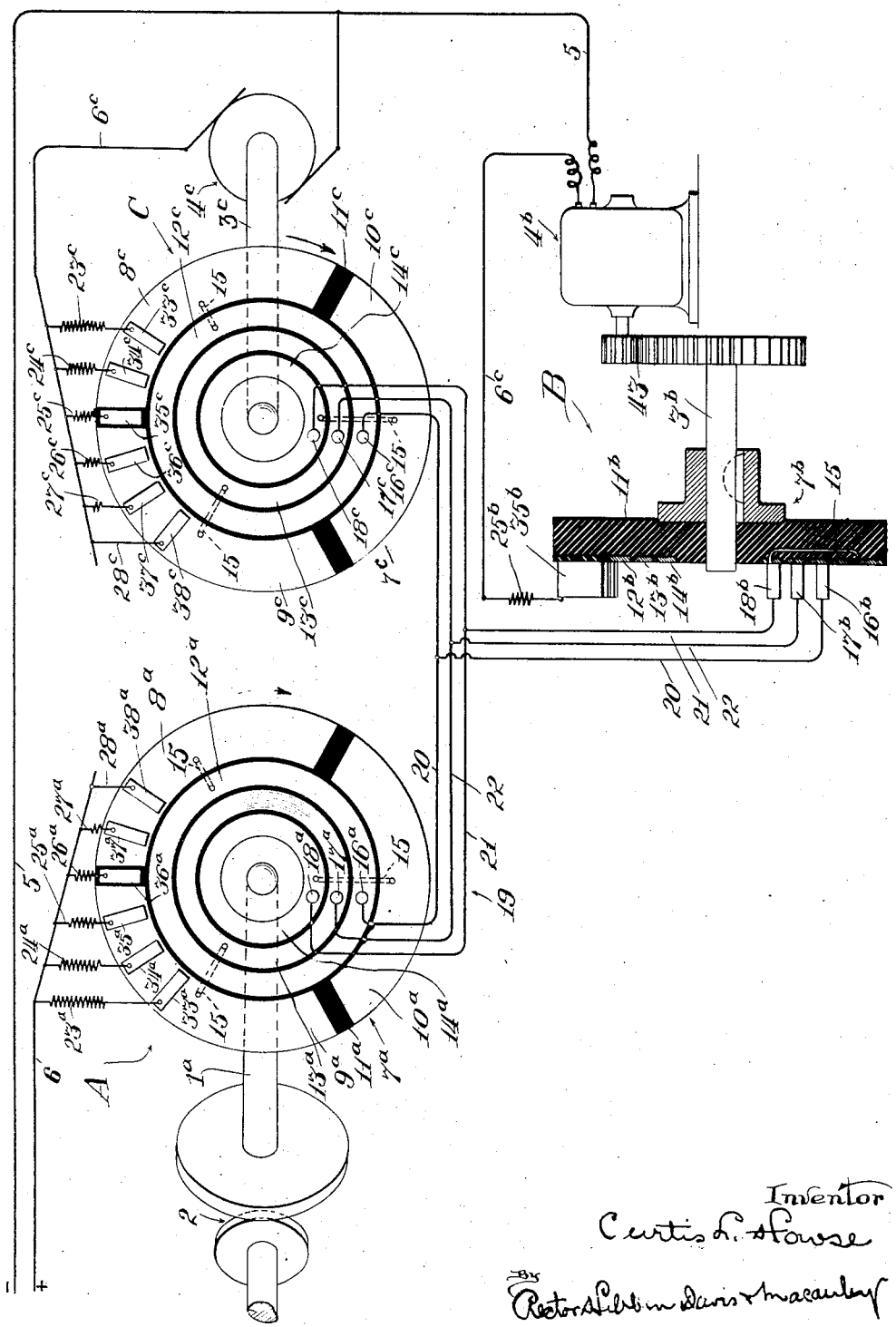
Inventor
Curtis L. Howse
By Rectors Hilliam Davis & Macauley
Attorneys Patented Nov. 4, 1924.

1,513,993

UNITED STATES PATENT OFFICE.

CURTIS L. HOWSE, OF DETROIT, MICHIGAN, ASSIGNOR TO THE UNDERFEED STOKER COMPANY OF AMERICA, OF DETROIT, MICHIGAN, A CORPORATION OF NEW JERSEY.

ELECTRICAL CONTROL APPARATUS FOR SECURING SHAFT SYNCHRONISM.

Application filed March 31, 1921. Serial No. 457,385.

*To all whom it may concern:*

Be it known that I, CURTIS L. HOWSE, a citizen of Great Britain, residing at Detroit, in the county of Wayne and State of Michigan, have invented certain new and useful Improvements in Electrical Control Apparatus for Securing Shaft Synchronism, of which the following is a specification.

My invention pertains to shaft-speed synchronizing means, and has for its general object to provide means for so controlling the speed of a secondary shaft that is electric-motor driven as to maintain it in definite ratio to the speed of a primary shaft that may itself be subject to wide variation in speed.

Often it is undesirable to make purely mechanical connection between the two shafts, because of mechanical intricacies involved and because of desirability of separately-driving the controlled, or secondary, shaft; and in many instances it is likewise undesirable to follow the practice that heretofore has been suggested of equipping the primary, variable-speed shaft with an electric generator that shall be electrically connected to drive a synchronous motor actuating the secondary shaft, because of generator-expense and because of difficulty in securing operation of the secondary shaft with sufficient torque under a wide range of variation of speed of the primary shaft. According to my invention I attain all the desired flexibility in the matter of installation that inheres in employing only electric-wiring as a physical connection between parts associated with the two shafts, and yet I retain desired positiveness of drive of the controlled shaft, by arranging the latter to be driven by a motor that is energized from an extraneous power circuit. The synchronizing action I attain by subjecting the motor to electrical control by means responsive to variations in speed-ratio as between the primary and secondary shafts.

In the drawings the single figure represents in purely diagrammatic fashion an equipment embodying my invention, showing a controlling station A and two controlled or secondary stations B and C. Since, for simplification, substantially duplicate mechanisms are shown as far as possible, like parts are similarly numbered distinguished by exponents "a," "b" and "c" to correspond with the respective stations.

The primary or controlling shaft $1^a$ at controlling station A may be any rotative machine-element and may be subject to wide speed variation, as is graphically suggested by the illustration of a variable speed friction drive 2. In known ratio to the speed of shaft $1^a$ secondary or controlled shafts $3^b$ and $3^c$ are to be driven, each by its individual electric motor $4^b$ or $4^c$, these motors being supplied with current from an extraneous source through the supply wires 5 and 6. The motor may drive its control-shaft directly as at station C or through gearing as shown at 43 in station B. These motors are preferably either direct current or single-phase series alternating current motors and their speed is governed by the cutting of resistance into or out of the supply circuit, the resistance for each motor being controlled according to the lag or lead of the controlled shaft ($3^b$ or $3^c$) in relation to the governing shaft $1^a$. Whatever may be the speed of the primary shaft $1^a$, if the secondary shaft $3^b$ or $3^c$ tends to lag below the same speed, resistance in the circuit of motor $4^b$ or $4^c$ is decreased until the motor drives its controlled shaft at primary-shaft speed; while tendency of either said secondary shaft to exceed the primary-shaft speed results in increase of the resistance, and accordant slowing down of the motor driven shaft to establish synchronism.

In the particular construction shown shaft $1^a$ is shown as equipped with a rotary control-head or distributor $7^a$ for rotation therewith, and each controlled-shaft may be provided with a head $7^b$ or $7^c$ identical in construction therewith; heads $7^a$ and $7^c$ being shown in elevation, head $7^b$ in section. Such head or distributor (referring to station A) may provide in any suitable form a succession of endwise-separated insulated contact strips, preferably three in number, shown as sectors $8^a$, $9^a$ and $10^a$, mounted near the periphery of a disc $11^a$, and these respective contact strips of the primary distributor are constantly electrically connected with the like strips of the secondary heads, in parallel. To this end the disc $7^a$ carries collector rings $12^a$, $13^a$ and $14^a$ insulated one from the other, respectively connected by wires 15 to the several segments $8^a$, $9^a$ and $10^a$, the collector-rings receiving in contact therewith the respective stationary brushes $16^a$, $17^a$ and 18ᵃ. These brushes of the primary head are directly connected by the multiple-branched wires generally designated 19 (but severally identified as 20, 21 and 22) with the corresponding brushes for the distributor heads 7ᵇ and 7ᶜ appurtenant to the two secondary shafts.

The motor-governing resistance for each secondary station is controlled jointly by the contact-segments of its own distributor and those of the primary distributor, by virtue of an arrangement such that as long as the angular relation between like segments of the two heads remains unchanged the resistance (average) remains unchanged while change of such angular relation changes the average resistance, raising it when the secondary head leads the primary head, reducing it when the secondary head lags. Thus, one leg of the motor supply circuit, such as wire 5 may have direct connection with one terminal of each motor but the other motor terminal has connection with wire 6 through the contact strips of the two said distributor heads, the resistance elements associated therewith, and the heads-connecting wiring 19. In the specific construction shown wire 6 runs first to the primary control head where it has connected with it in parallel a number of resistance elements of graded strength decreasing in the direction of head-rotation, the group of resistances being indicated at 23ᵃ to 27ᵃ and the wire-end 28ᵃ constituting a zero-resistance tap. These resistance taps are respectively connected with contact brushes 33ᵃ to 38ᵃ disposed in spaced relation as fixed contacts to bear on the traveling segments, and preferably the brushes are all within the angular span of one segment. Further it is my preference that the insulating gaps between successive segments shall be broader than a brush, to prevent any temporary connection being established between successive segments. In respect of the distributor head for each secondary shaft the same arrangement of brushes and resistances may be provided, except that (referring to station C) the graded resistances from zero resistance 28ᶜ to highest resistance 23ᶜ are arranged in opposite strength-progression from those associated with the primary shaft, that is to say increasing in the direction of head-rotation. Therefore, as to the distributor for the primary shaft, a given segment (say 9ᵃ) first encounters the brush for the highest strength-resistance, whereas at station C the corresponding segment 9ᶜ first encounters the brush 38ᶜ affording lowest resistance connection to the motor.

Since corresponding segments of the primary and secondary heads are constantly connected through wiring 19 it will now be apparent that the two distributor heads will jointly control the resistance-condition in the motor-supply circuit. In normal operation of the mechanism, with the two shafts operating in unison and the segments thereof in symmetry or angular congruence, moments will cyclically occur when all resistance-brushes of both heads rest on like-connected segments, so that "zero-resistance" or minimum resistance condition exists, but through a larger part of the cycle of head rotation the current will flow between wires 6 and 6ᶜ through a split path including two segments and two of the three connections 19, the average resistance being a calculable and definite quantity although momentarily the resistance varies as the gaps between the two active segments of the respective heads progress past the fixed resistance-terminals or brushes. Hereinafter in referring generally to the resistance of the motor circuit I mean such average resistance.

Of course the speed of the motor-driven secondary shaft, (above assumed to be uniform with that of the primary shaft), will be a speed determined by the resistance interposed in the motor circuit, and with the construction shown this resistance will be automatically adjusted (whenever the two shafts tend to travel at different speeds) to maintain shaft-synchronism. Thus if shaft 1ᵃ slows down, shaft 3ᶜ, beginning to overrun the primary shaft, advances head 7ᶜ to lead the primary head 7ᵃ and this relative head-displacement increases the resistance (average) in the motor circuit. Reversely, lagging of the secondary head behind the primary head decreases the motor-circuit resistance to the point where the shaft speeds are again uniform. In the construction shown this effect may, perhaps, most readily be visualized by omitting from consideration all of the resistance-terminals except zero-resistance brushes 38ᵃ and 38ᶜ and the highest resistance brushes 33ᵃ and 33ᶜ. With the two heads 7ᵃ and 7ᶜ rotating in the symmetrical position shown there will be brief instants when both said brushes appurtenant to each head will rest on the corresponding segment (8ᵃ or 8ᶜ, say) of the head, establishing zero-resistance connection with the motor, and there will also be brief instants when the brushes 38ᵃ or 38ᶜ are out of segment-contact and the only connection will be through the high resistances 23ᵃ or 23ᶜ, but during almost the entire cycle the motor connection will be through two paths in parallel, each path including a high resistance element. This may therefore be roughly regarded as the average-resistance condition productive of a middling motor-speed. If, now, (continuing the hypothesis of omitting intermediate resistances), one assumes the head 7ᶜ for shaft 3ᶜ as leading the head 7ᵃ of shaft 1ᵃ by, say, 60 degrees, it will readily be seen that there will be no time when zero resistance is established, but that there will be a considerable time when the two high resistances will be connected in series and that the remainder of the time they will be in parallel, so that the average resistance is much greater than under the condition first assumed. Control is therefore being effected to hold down or to reduce the motor speed. And conversely, if one assumes the secondary control head $7^c$ to be lagging 60 degrees behind the primary head $7^a$, there will be a very substantial part of the cycle of rotation during which the zero-resistance condition will be established, and the remainder of the time the two high resistances will be connected in parallel, but no condition will ever be established where the two high resistances are in series, so that the average resistance in the motor circuit is low. Therefore the motor is being controlled to keep up or to attain a high speed. With finer gradations of control the stated action takes place with the numerous graded resistance elements arranged as shown. Resultantly, as the speed of the primary shaft is arbitrarily changed, the speed of the motor-driven shaft will momentarily depart from the desired ratio but only until the control head on the motor-driven shaft has attained such lag or lead as, by varying the resistance of the motor supply circuit, re-establishes the desired synchronism.

It will be understood that wide departures may be made from the construction, design and arrangement of the simple devices that are schematically illustrated herein for ease of exposition without departure from the spirit of my invention and within the scope of the appended claims.

I claim:

1. The combination with a primary shaft and a motor driven secondary shaft, of control heads respectively associated with the primary and secondary shafts for rotation therefrom, each such head having a plurality of contract strips, electrical connections between corresponding strips of the two heads, two sets of resistance elements having terminals to coact with the respective head-strips, said resistance elements being graded oppositely in the direction of rotative progress of the respective heads, and motor connections arranged to be made through said resistance elements, whereby the resistance in the motor circuit is variable according to relative rotative lag or lead of the heads.

2. The combination with a primary shaft and a motor-driven secondary shaft, of control heads respectively associated with the primary and secondary shafts for rotation thereby, each such head having a plurality of elongated contact members disposed for successive action; direct electrical connections between corresponding contact members of the two heads, two sets of resistance elements having terminals to coact respectively with any said elongated contact of the corresponding head, said resistance elements being graded oppositely in the direction of rotative progress of the respective heads, and motor connections arranged to be made through said resistance elements, whereby the resistance in the motor circuit is variable according to the relative rotative lag or lead of the heads.

CURTIS L. HOWSE.